United States Patent
Kojou et al.

(10) Patent No.: US 7,539,883 B2
(45) Date of Patent: May 26, 2009

(54) INFORMATION PROCESSING APPARATUS AND CONTROL METHOD FOR TRANSITIONING A STATE OF A COMMUNICATION PATH BETWEEN AN ACTIVE STATE AND A STANDBY STATE

(75) Inventors: Akihiro Kojou, Hamura (JP); Hiroyuki Oda, Akishima (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 498 days.

(21) Appl. No.: 11/352,447

(22) Filed: Feb. 10, 2006

(65) Prior Publication Data
US 2006/0184809 A1    Aug. 17, 2006

(30) Foreign Application Priority Data
Feb. 10, 2005    (JP)    ............... 2005-034725

(51) Int. Cl.
G06F 1/00    (2006.01)
G06F 1/26    (2006.01)
G06F 1/32    (2006.01)

(52) U.S. Cl. .................. 713/320; 713/300; 713/324; 713/340

(58) Field of Classification Search ................. 713/300, 713/320, 324, 340
See application file for complete search history.

(56) References Cited

U.S. PATENT DOCUMENTS

| | | | | |
|---|---|---|---|---|
| 5,230,074 A | * | 7/1993 | Canova et al. | 714/14 |
| 5,910,930 A | * | 6/1999 | Dieffenderfer et al. | 368/156 |
| 6,272,642 B2 | * | 8/2001 | Pole et al. | 713/300 |
| 6,282,662 B1 | * | 8/2001 | Zeller et al. | 713/300 |
| 6,442,700 B1 | * | 8/2002 | Cooper | 713/320 |
| 6,470,290 B1 | * | 10/2002 | Lee et al. | 713/320 |

(Continued)

FOREIGN PATENT DOCUMENTS

JP    05-233551    9/1993

(Continued)

OTHER PUBLICATIONS

Intel, PCI Express Architecture Power Management, 2002, Rev 1.1, pp. 1-14.*

(Continued)

*Primary Examiner*—Mark Connolly
(74) *Attorney, Agent, or Firm*—Knobbe, Martens, Olson & Bear LLP

(57) ABSTRACT

According to one embodiment, an information processing apparatus includes first and second devices that are interconnected via a communication path, each of the first and second devices having a communication path control function for transitioning a state of the communication path between an active state and a standby state, based on whether the communication path is in an idle state or not, a unit that switches an operation mode of the apparatus between a first mode in which priority is placed on performance and a second mode in which priority is placed on power saving, and a unit that permits execution of the communication path control function in a case where the operation mode is switched from the first mode to the second mode, and prohibits execution of the communication path control function in a case where the operation mode is switched from the second mode to the first mode.

3 Claims, 4 Drawing Sheets

U.S. PATENT DOCUMENTS

| | | | |
|---|---|---|---|
| 7,137,018 B2 * | 11/2006 | Gutman et al. | 713/323 |
| 7,315,952 B2 * | 1/2008 | Wilcox et al. | 713/320 |
| 2005/0030808 A1 * | 2/2005 | Brown et al. | 365/222 |
| 2006/0156041 A1 * | 7/2006 | Zaretsky et al. | 713/300 |
| 2007/0050653 A1 * | 3/2007 | Verdun | 713/320 |
| 2007/0094519 A1 * | 4/2007 | Yamamoto | 713/300 |

FOREIGN PATENT DOCUMENTS

| | | |
|---|---|---|
| JP | 2002-308138 | 10/2003 |
| JP | 2004-157590 | 6/2004 |

OTHER PUBLICATIONS

Catalyst, General Description of Power Management Features, 2005, pp. 1-14.*

Shaohua Li, PCIE ASPM Support—takes 3, 2008, pp. 1-30.*

* cited by examiner

INFORMATION PROCESSING APPARATUS AND CONTROL METHOD FOR TRANSITIONING A STATE OF A COMMUNICATION PATH BETWEEN AN ACTIVE STATE AND A STANDBY STATE

CROSS-REFERENCE TO RELATED APPLICATIONS

This application is based upon and claims the benefit of priority from prior Japanese Patent Application No. 2005-034725, filed Feb. 10, 2005, the entire contents of which are incorporated herein by reference.

BACKGROUND

1. Field

One embodiment of the invention relates to an information processing apparatus such as a personal computer, and a control method of controlling the operation of the apparatus.

2. Description of the Related Art

In recent years, in the technical field of information processing apparatuses such as personal computers, attention has been paid to a third-generation I/O interconnect interface that is called "PCI EXPRESS". PCI EXPRESS is a standard for interconnecting devices via a communication path that is called "link". PCI EXPRESS is stipulated by PCI SIG (Peripheral Component Interconnect Special Interest Group). In the PCI EXPRESS standard, transmission of data between devices is executed using packets.

In the PCI EXPRESS standard, a communication path control function, which can set the link at a low power state even if the device is in an active state, is provided. This communication path control function is referred to as "Active State Power Management (ASPM)". The state of the link is automatically set by hardware from an active state to a low power state (standby state) when the link is in an idle state. When a need for communication arises, the state of the link is restored by hardware to the active state from the standby state. The ASPM function can reduce useless power consumption during the idle state of the link, and can reduce the power consumption of the information processing apparatus.

Jpn. Pat. Appln. KOKAI Publication No. 2004-157590 discloses a technique wherein power consumption is reduced by switching the bus width of a data bus from a 32-bit width to a 16-bit width.

In the technique of KOKAI No. 2004-157590, however, if the bus width is switched to the 16-bit width, the data transfer speed of the bus considerably lowers.

In addition, in the ASPM function, the link is set in the standby state when the link is in the idle state. Thus, unlike the technique of KOKAI No. 2004-157590, the actual data transfer speed is not affected.

However, in order to restore the state of the link from the standby state to the active state, a delay will occur. The delay may cause degradation in system performance. Consequently, if the ASPM function is always used, the real performance of the system cannot fully be exhibited.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, an information processing apparatus includes a first device and a second device that are interconnected via a communication path, each of the first and second devices having a communication path control function for transitioning a state of the communication path between an active state and a standby state in which power consumption is lower than in the active state, on the basis of whether the communication path is in an idle state or not, means for switching an operation mode of the information processing apparatus between a first mode in which priority is placed on performance and a second mode in which priority is placed on power saving, and means for permitting execution of the communication path control function in a case where the operation mode is switched from the first mode to the second mode, and prohibiting execution of the communication path control function in a case where the operation mode is switched from the second mode to the first mode.

Figure 1:
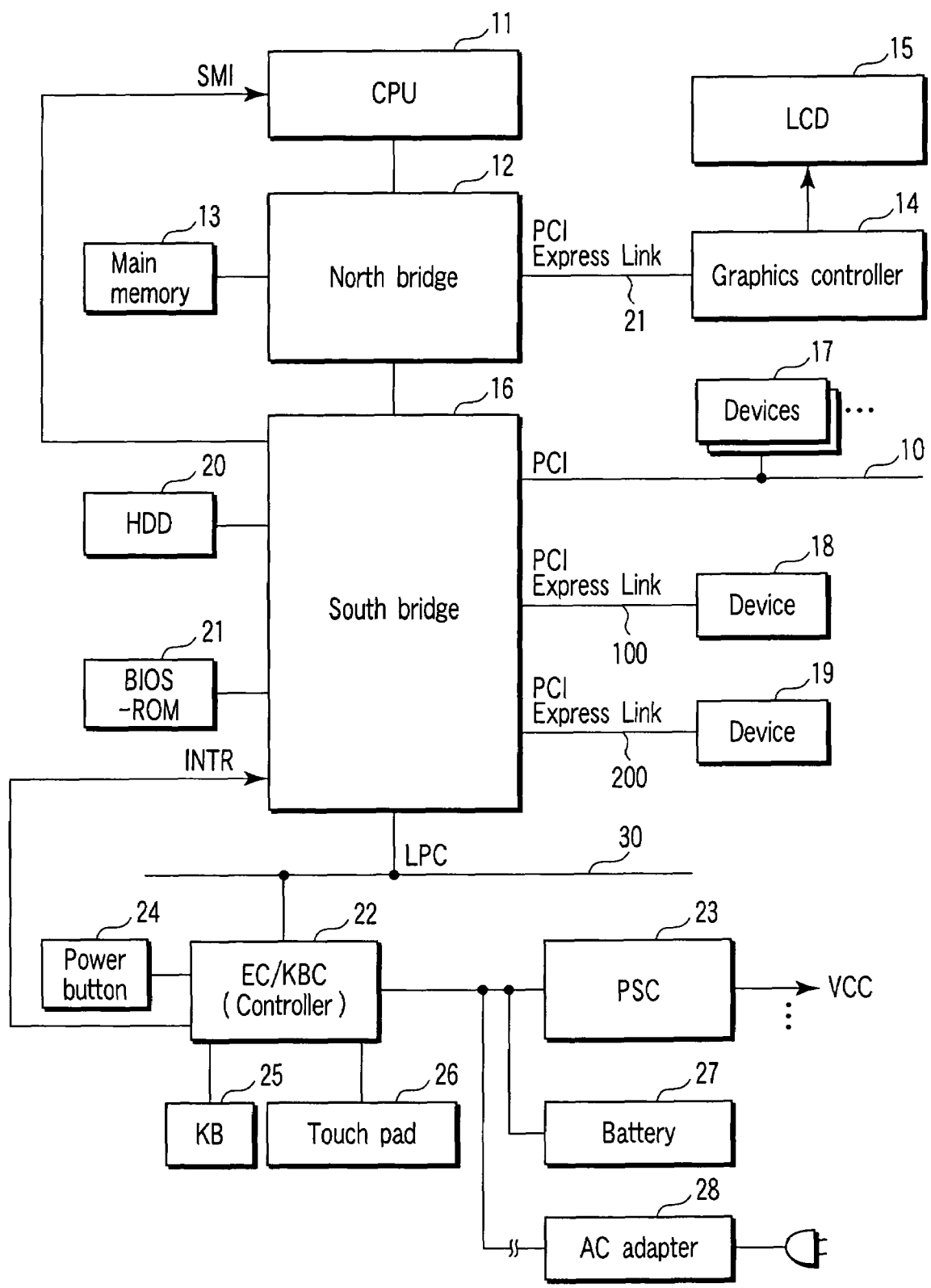
FIG. 1 is a block diagram that shows an example of a system configuration of an information processing apparatus according to an embodiment of the present invention.

FIG. 1 shows a system configuration of an information processing apparatus according to an embodiment of the invention. This information processing apparatus is realized as a battery-powerable notebook personal computer.

The personal computer includes a built-in battery 27. In the state in which the personal computer is not connected to an external power supply (AC power supply), the personal computer is powered by the built-in battery 27. On the other hand, in the state in which an AC adapter 28 is connected to the personal computer, that is, in the state in which the personal computer is connected to the external power supply (AC power supply), the personal computer is powered by the external power supply (AC power supply). The battery 27 is charged by the external power supply.

The personal computer, as shown in FIG. 1, comprises a CPU (Central Processing Unit) 11, a north bridge 12, a main memory 13, a graphics controller 14, a display device (LCD) 15, a south bridge 16, PCI (Peripheral Component Interconnect) devices 17, PCI Express devices 18 and 19, a hard disk drive (HDD) 20, a BIOS-ROM 21, an embedded controller/ keyboard controller IC (EC/KBC) 22, a power supply controller (PSC) 23, a keyboard (KB) 25, and a touch pad 26.

The north bridge 12, graphics controller 14, south bridge 16 and PCI Express devices 18 and 19 are realized, for example, as devices (also referred to as "components") that support PCI EXPRESS standard. Communication between the north bridge 12 and graphics controller 14 is executed via a PCI EXPRESS link 21 that is provided between the north bridge 12 and graphics controller 14. Similarly, communication between the south bridge 16 and PCI Express device 18 is executed via a PCI EXPRESS link 100 that is provided between the south bridge 16 and PCI Express device 18, and communication between the south bridge 16 and PCI Express device 19 is executed via a PCI EXPRESS link 200 that is provided between the south bridge 16 and PCI Express device 19. Each PCI EXPRESS link is a communication path that is composed of a serial interface, and includes an upstream lane and a downstream lane.

The CPU 11 is a processor that controls the operation of the computer, and executes various programs (an operating system and application programs) that are load in the main memory 13 from the HDD 20. The CPU 11 also executes a BIOS (Basic Input/Output System) that is stored in the BIOS-ROM 21. The BIOS is a program for controlling the hardware. The BIOS has a function of switching the operation mode of the computer between a first mode in which priority is placed on the performance, and a second mode in which priority is placed on the power saving (low power consumption). Further, the BIOS includes an SMI (System Management Interrupt) routine for dynamically permitting/prohibiting the execution of an active state power management (ASPM) function, which is specified in the PCI EXPRESS standard, in accordance with the operation mode of the computer. As has been mentioned above, the ASPM function is a communication path control function that can set the link, to which a device supporting PCT EXPRESS standard is connected, to a low power state (standby state) even when the device is in an active state (D0 state). Each of two devices, which are connected via the link, has the ASPM function (communication path control function). On the basis of whether the link is in the idle state or not, the state of the link can be transitioned between an active state and a standby state in which the power consumption is lower than in the active state. The transition is automatically executed by hardware.

The CPU 11 executes the BIOS, and thereby the CPU 11 functions as an operation mode switching unit and a control unit. The operation mode switching unit switches the operation mode of the computer between the first mode in which priority is placed on the performance, and the second mode in which priority is placed on the power saving (low power consumption). When the operation mode of the computer is switched from the first mode to the second mode by the operation mode switching unit of the CPU 11, the control unit of the CPU 11 permits execution of the ASPM function (communication path control function). When the operation mode of the computer is switched from the second mode to the first mode by the operation mode switching unit of the CPU 11, the control unit of the CPU 11 prohibits execution of the ASPM function (communication path control function). Each of the operation mode switching unit and the control unit may be realized by dedicated hardware.

The north bridge 12 is a bridge device that connects a local bus of the CPU 11 and the south bridge 16. The north bridge 12 includes a memory controller that access-controls the main memory 13. Further, the north bridge 12 has a function of executing communication with the graphics controller 114 via the PCI EXPRESS link 21.

The graphics controller 14 is a display controller that controls the LCD 15, which is used as a display monitor of the computer. The south bridge 16 executes communication with the devices 17 via a PCI bus 10. The south bridge 16 has a function of executing communication with the PCI Express device 18 via the PCI EXPRESS link 100, and a function of executing communication with the PCI Express device 19 via the PCI EXPRESS link 200. Further, the south bridge 16 executes control of the devices on an LPC (Low Pin Count) bus 30.

The embedded controller/keyboard controller IC (EC/KBC) 22 is a 1-chip microcomputer in which an embedded controller for power management and a keyboard controller for controlling the keyboard (KB) 25 and touch pad 26 are integrated. The embedded controller/keyboard controller IC (EC/KBC) 22 has a function of powering on/off the computer in cooperation with the power supply controller (PSC) 23 in response to the user's operation of the power button 24. Further, the embedded controller/keyboard controller IC (EC/KBC) 22 has a function of detecting connection/disconnection of the external power supply (AC adapter 28) to/from the computer. When an event of connection/disconnection of the AC adapter 28 occurs, the embedded controller/keyboard controller IC (EC/KBC) 22 generates an interrupt signal (INTR) in order to inform the BIOS of the occurrence of a power management event.

In this manner, the EC/KBC 22 functions as a controller that generates the interrupt (INTR) signal in response to the connection/disconnection of the external power supply to/from the computer.

In response to the occurrence of the interrupt signal (INTR), the south bridge 16 generates an interrupt signal (SMI) to the CPU 11. Responding to the SMI, the CPU 11 executes the SMI routine of the BIOS. The SMI may be supplied directly from the EC/KBC 22 to the CPU 11.

Figure 2:
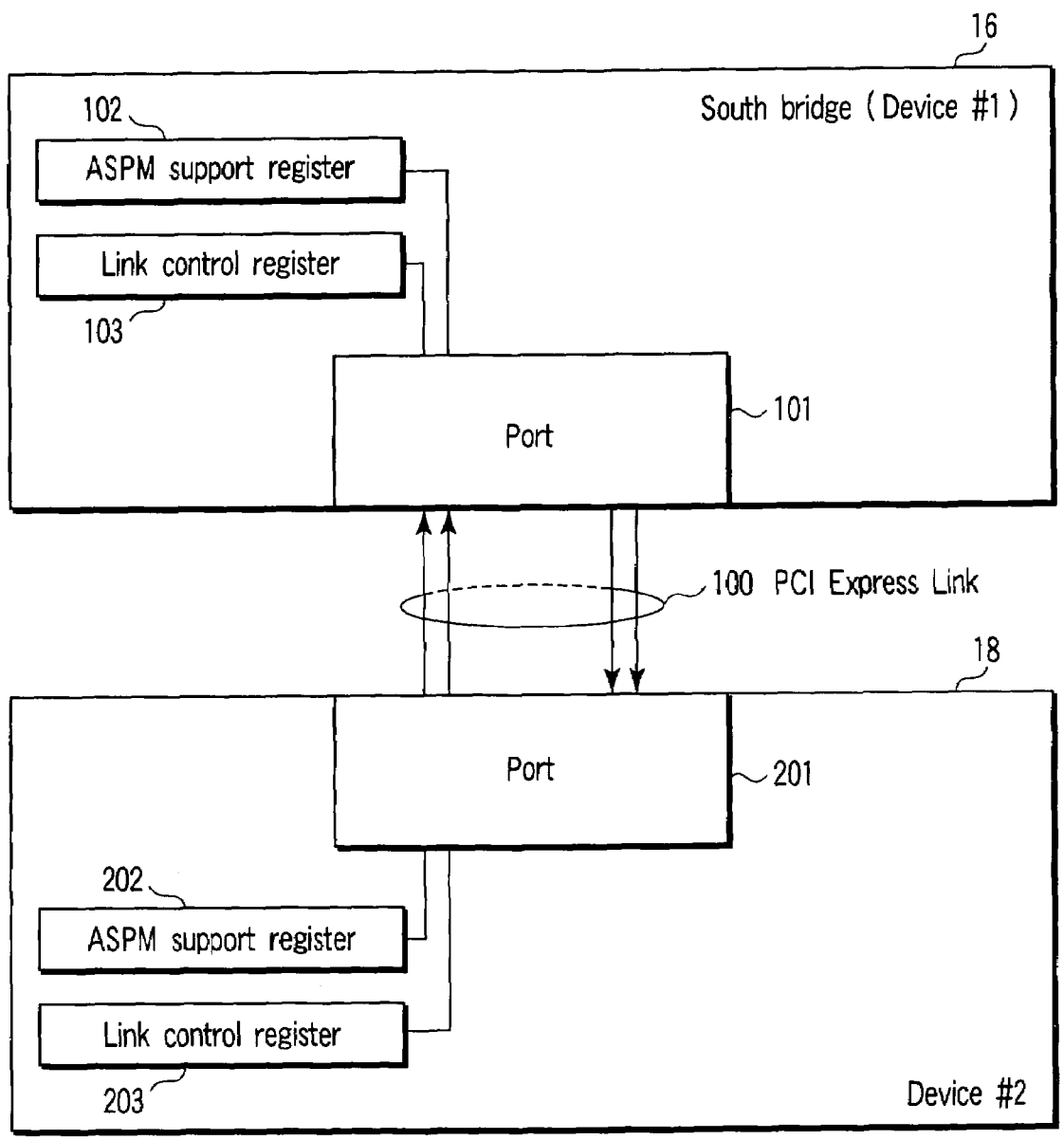
FIG. 2 is a block diagram that illustrates an example of a connection scheme between devices provided in the information processing apparatus according to the embodiment.

FIG. 2 illustrates a connection scheme between two devices that support the PCI EXPRESS standard. The south bridge 16 and PCI Express device 18 are described as the two devices by way of example. In the description below, the south bridge 16 is referred to as "first device #1", and the PCI Express device 18 is referred to as "second device #2".

The first device #1 and second device #2 are interconnected via the PCI EXPRESS link 100. The PCI EXPRESS link 100 is a serial interface (serial bus) that connects the first device #1 and second device #2 in a point-to-point scheme. The PCI EXPRESS link 100 includes a differential signal line pair for transmitting information in a direction from the first device #1 to the second device #2, and a differential signal line pair for transmitting information in a direction from the second device #2 to the first device #1. Transmission of information between the first device #1 and second device #2 via the PCI EXPRESS link 22 is executed using packets.

The first device #1 has a port 101 that is connected to the PCI EXPRESS link 100. Similarly, the second device #2 has a port 102 that is connected to the PCI EXPRESS link 100.

The port 101 includes a transmission unit that transmits data to the second device #2 via the PCI EXPRESS link 100, and a reception unit that receives data, which is transmitted from the second device #2, via the PCI EXPRESS link 100. Similarly, the port 102 includes a transmission unit that transmits data to the first device #1 via the PCI EXPRESS link 100, and a reception unit that receives data, which is transmitted from the first device #1, via the PCI EXPRESS link 100. Each of the ports 101 and 102 detects that the PCI EXPRESS link 100 is in the idle state if a state, in which data (effective data) to be transmitted via the PCI EXPRESS link 100 is absent, continues for a predetermined time period. In this case, the ports 101 and 102 cooperate to execute a process for transitioning the state (link state) of the PCI EXPRESS link 100 from the active state to the standby state. In the standby state, the operation of each of the transmission unit and the reception unit is halted, and the PCI EXPRESS link 100 is not driven. Accordingly, the power consumption is reduced.

Figure 3:
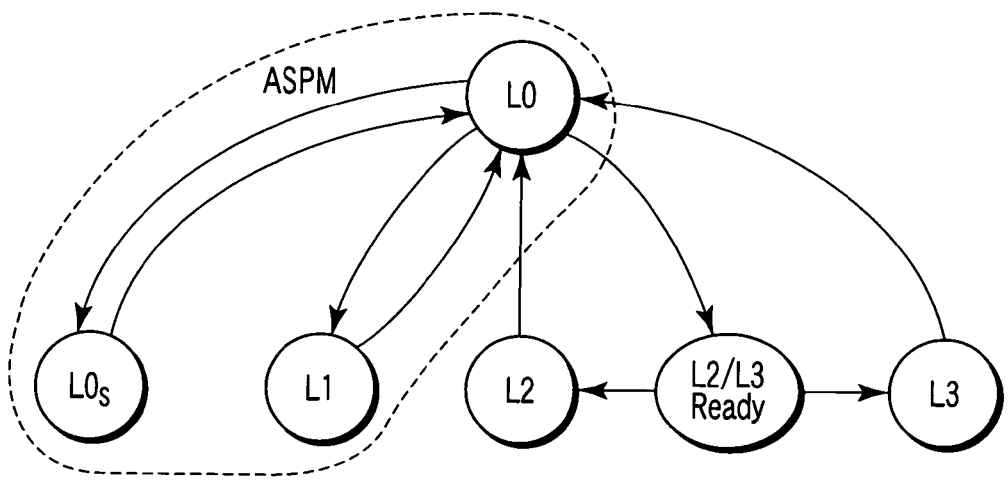
FIG. 3 illustrates an example of a transition of link states that are used in the information processing apparatus according to the embodiment.

As is illustrated in a link state transition diagram of FIG. 3, in the PCI EXPRESS standard, the following link states are defined: L0, L0s, L1, L2, L2/L3 Ready, and L3. L0 denotes a normal operation state (active state). L0s, L1, L2, L2/L3 Ready, and L3 designate low power states in which the power consumption is lower than in the link state L0. The power consumption successively decreases in the order of L0s, L1, L2/L3 Ready, L2, and L3.

In the PCI EXPRESS standard, two standby states L0s and L1 are defined as low power states to which the PCI EXPRESS link can transition when the PCI EXPRESS device is in the active state. L1 is a standby state in which the power consumption is lower than in L0s. A delay time that is needed for restoration from L0s to L0 is shorter than a delay time that is needed for restoration from L1 to L0. It is generally assumed that a PCI EXPRESS device is required to support at least L0s as a low power state to which the PCI EXPRESS link can transition when the PCI EXPRESS device is in the active state. Besides, there is known a PCI EXPRESS device that supports two standby states L0s and L1 as low power states to which the PCI EXPRESS link can transition when the PCI EXPRESS device is in the active state.

The ports 101 and 102 cooperate when there occurs data to be transmitted to the counterpart, and execute a process for restoring the state (link state) of the PCI EXPRESS link 100 from the current L0s or L1 to L0.

The first device #1, as shown in FIG. 2, includes an ASPM support register 102 and a link control register 103. The ASPM support register 102 and link control register 103 are configured to be accessible from the CPU 11. The ASPM support register 102 includes a field that is indicative of the kinds of standby states, which the first device #1 supports for the ASPM. The BIOS read-accesses the ASPM support register 102, thus being able to recognize the kinds of standby states, which the first device #1 supports for the ASPM. The link control register 103 includes a field for storing power management control information that instructs permission or prohibition of the execution of the ASPM function. The BIOS writes the power management control information in the link control register 103, thereby being able to instruct permission or prohibition of execution of the ASPM function to the port 101 of the first device #1.

The power management control information is composed of two bits. Specifically, "00" instructs prohibition of both of transition to L0s and transition to L1, "01" instructs permission of transition to L0s and prohibition of transition to L1, and "11" instructs permission of both of transition to L0s and transition to L1. The first device #1 transitions to a deepest-level one of the permitted standby states, which are supported by the first device #1. For example, if transition to L0s and transition to L1 are both permitted and the device supports both L0s and L1, the link state transitions to L1 at the time when the link is in the idle state.

In this way, using the power management control information, the BIOS can not only permit or prohibit the execution of the ASPM function, but can also instruct the first device #1 which of the standby states L0s and L1 the link state should transition to.

The second device #2, like the first device #1, includes an ASPM support register 202 and a link control register 203. The functions of the ASPM support register 202 and link control register 203 are the same as those of the above-described ASPM support register 102 and link control register 103.

In the present embodiment, the control of permission/prohibition of execution of the ASPM function is dynamically executed in accordance with the switching of the operation mode of the computer.

Figure 4:
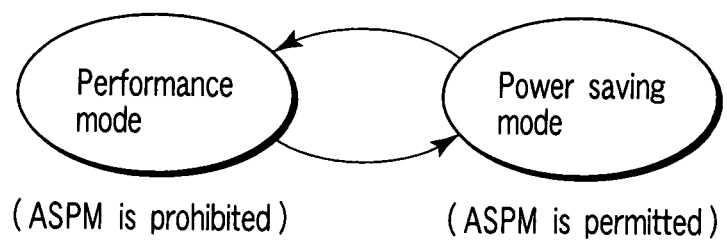
FIG. 4 is a view for explaining an example of two operation modes of the information processing apparatus according to the embodiment.

The computer has two modes, that is, a performance mode and a power saving mode, as shown in FIG. 4. The performance mode corresponds to the above-described first mode, and the power saving mode corresponds to the above-described second mode.

To be more specific, the performance mode is an operation mode in which priority is given to the system performance over the power saving (low power consumption), and the power saving mode is an operation mode in which priority is given to the power saving (low power consumption) over the system performance. In accordance with an instruction by the user, or in accordance with the connection/disconnection of the computer to/from the external power supply, the BIOS dynamically switches the operation mode of the computer between the performance mode and the power saving mode. For example, when the external power supply is connected to the computer (AC driving mode), the operation mode of the computer is automatically set to the performance mode by the BIOS, more specifically, by the CPU 11 that executes the BIOS. When the external power supply is disconnected from the computer (battery driving mode), the operation mode of the computer is automatically set to the power saving mode by the BIOS, more specifically, by the CPU 11 that executes the BIOS. Besides, regardless of the AC driving/battery driving, the user can explicitly designate one of the performance mode and the power saving mode, for example, using a system environment setting screen that is provided by the BIOS. Thereby, even at the time of the battery driving, for example, the computer can be driven in the performance mode.

It is possible to assign the function of a hot key for designating the performance mode to a predetermined key on the keyboard 25, and to assign the function of a hot key for designating the power saving mode to another key. In this case, the user can explicitly designate one of the performance mode and the power saving mode by pressing the hot key on the keyboard 15.

In the performance mode, the execution of the ASPM function is prohibited by the BIOS, more specifically, by the CPU 11 that executes the BIOS. In this case, even in the period in which the PCI Express link is in the idle state, the state of the PCI Express link is kept at L0.

On the other hand, in the power saving mode, the execution of the ASPM function is permitted by the BIOS, more specifically, by the CPU 11 that executes the BIOS. In this case, the state of the PCI Express link is automatically transitioned between L0 and L0s (or L1), on the basis of whether the PCI Express link is in the idle state or not.

Figure 5:
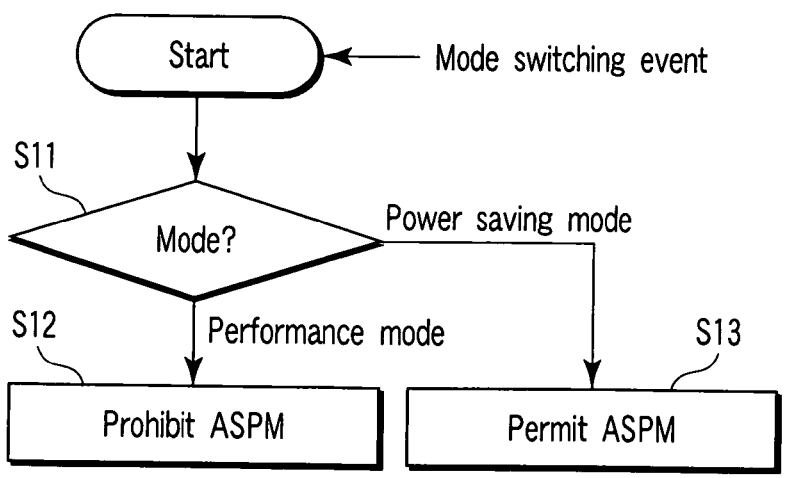
FIG. 5 is a flow chart illustrating an example of the procedure of an ASPM control process that is executed by the information processing apparatus according to the embodiment.

Next, referring to a flow chart of FIG. 5, a description is given of the procedure of the ASPM control process that is executed by the BIOS.

The BIOS executes the following process if there occurs a mode switching event that requires switching of the operation mode of the computer.

A mode switching event occurs, for example, in response to the user's operation on the system environment setting screen, the hot key operation by the user, or the connection/disconnection of the AC adapter 28. Responding to the mode switching event, the BIOS, i.e. the CPU 11, determines which of the performance mode and the power saving mode the operation mode of the computer should be set to (step S11). If the mode switching event has occurred due to the connection of the AC adapter 28, the BIOS, i.e. the CPU 11, determines that the operation mode of the computer is to be switched from the power saving mode to the performance mode. If the mode switching event has occurred due to the disconnection of the AC adapter 28, the BIOS, i.e. the CPU 11, determines that the operation mode of the computer is to be switched from the performance mode to the power saving mode. If the user explicitly designates one of the performance mode and the power saving mode, the BIOS, i.e. the CPU 11, determines, in accordance with the designation by the user, which of the performance mode and the power saving mode the operation mode of the computer should be set to.

If the performance mode is required by the mode switching event, the BIOS, i.e. the CPU 11, selects the performance mode as the operation mode of the computer, and writes power management control information "00" in the link control register of each device, thereby prohibiting the execution of the ASPM function (step S12). On the other hand, if the power saving mode is required by the mode switching event, the BIOS, i.e. the CPU 11, selects the power saving mode as the operation mode of the computer, and writes power management control information "01" or "11" in the link control register of each device, thereby permitting the execution of the ASPM function (step S13).

Figure 6:
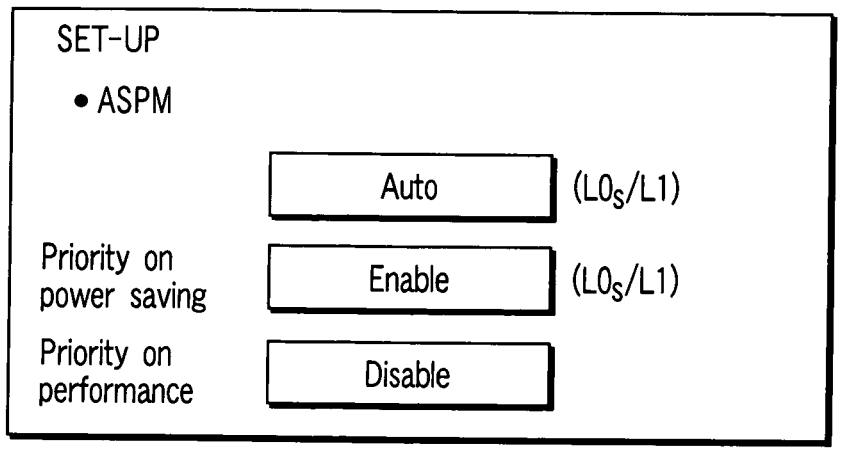
FIG. 6 shows an example of an environment setting screen that is used by the information processing apparatus according to the embodiment.

FIG. 6 shows an example of the system environment setting screen (SET-UP screen) that is displayed on the LCD 15 under the control of the BIOS, i.e. the CPU 11. This system environment setting screen is a screen for prompting the user to select the setting relating to the ASPM function. The BIOS, i.e. the CPU 11, controls the graphics controller 14 and causes the LCD 15 to display the system environment setting screen. The user can designate one of "Auto", "Enable" and "Disable" on the system environment setting screen.

If the user selects "Auto", the BIOS, i.e. the CPU 11, automatically effects switching between the performance mode and the power saving mode in accordance with the connection/disconnection of the external power supply. When "Auto" is selected, the BIOS, i.e. the CPU 11, also causes the system environment setting screen to display setting items for prompting the user to select one of L0s and L2 as the standby state of the link. Thus, the user can select one of L0s and L1.

"Enable" and "Disable" are setting items for prompting the user to select the power saving mode (ASPM function=effective) and the performance mode (ASPM function=non-effective). When "Enable" is selected, the system environment setting screen is caused to display setting items for prompting the user to select one of L0s and L1 as the standby state of the link. Thus, the user can select one of L0s and L1.

When "Enable" is selected by the user, the BIOS, i.e. the CPU 11, switches the operation mode of the computer to the power saving mode, and executes a process for permitting execution of the ASPM function. On the other hand, when "Disable" is selected by the user, the BIOS, i.e. the CPU 11, switches the operation mode of the computer to the performance mode, and executes a process for prohibiting execution of the ASPM function.

The BIOS, i.e. the CPU 11, stores the values of the setting items, which have been set on the system environment setting screen, in the BIOS-ROM 21 that is composed of a nonvolatile memory.

Figure 7:
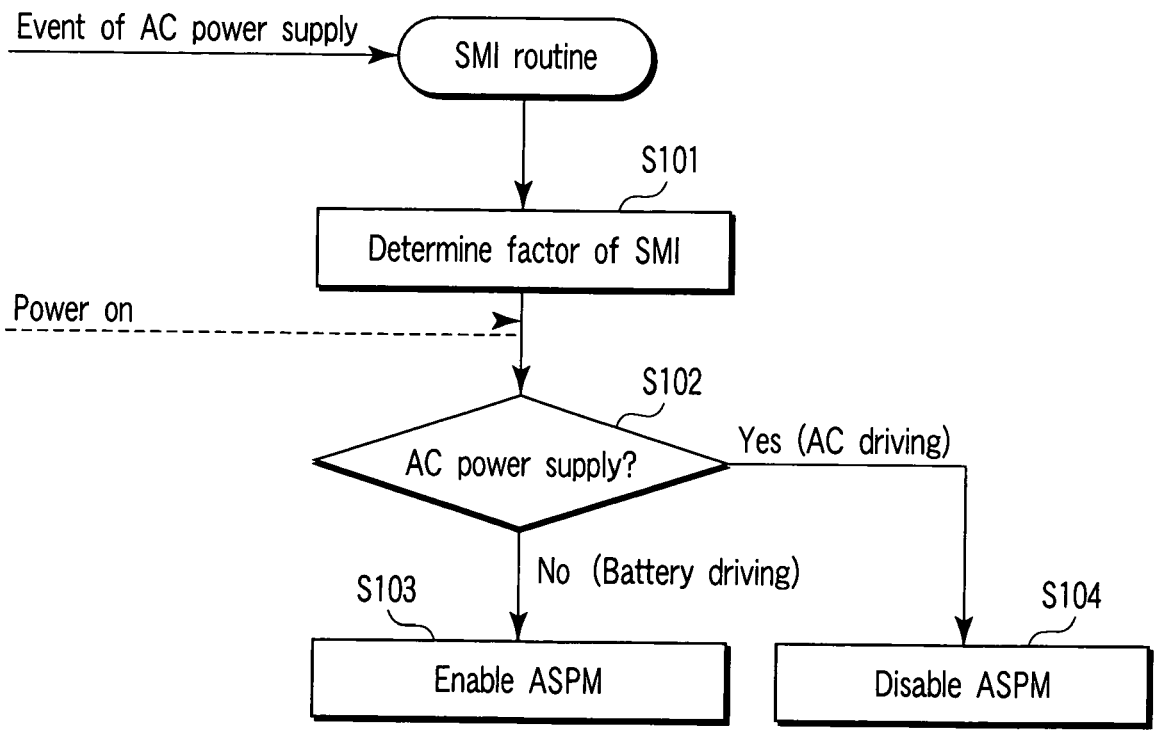
FIG. 7 is a flow chart illustrating an example of a specific procedure of the ASPM control process that is executed by the information processing apparatus according to the embodiment.

Next, referring to a flow chart of FIG. 7, a description is given of the procedure of the ASPM control process in the "Auto" mode.

In the case where the AC adapter 28 is connected to the computer while the computer is in operation, or in the case where the AC adapter 28 is disconnected from the computer while the computer is in operation, the EC/KBC 22 generates an interrupt signal (INTR) in order to inform the BIOS of the occurrence of a power management event. Responding to the interrupt signal (INTR), the south bridge 16 generates an interrupt signal (SMI) to the CPU 11. The CPU 11 executes the SMI routine of the BIOS in response to the SMI.

The SMI routine of the BIOS read-accesses, e.g. the status register of the interrupt controller in the south bridge 16, and determines the factor of the occurrence of the SMI (step S101). If the factor of the occurrence of the SMI is the occurrence of a power management event, the SMI routine of the BIOS read-accesses, e.g. the status register in the EC/KBC 22, and determines whether the external power supply is currently connected to the computer, that is, whether the power management event is due to the connection of the AC adapter 28 (step S102).

If the external power supply is connected to the computer, that is, if the power management event is due to the connection of the AC adapter 28 (YES in step S102), the SMI routine of the BIOS selects the performance mode as the operation mode of the computer, and writes power management control information "00" in the link control register of each device, thereby prohibiting the execution of the ASPM function (step S104).

On the other hand, if the external power supply is not connected to the computer, that is, if the power management event is due to disconnection of the AC adapter 28 (NO in step S102), the SMI routine of the BIOS selects the power saving mode as the operation mode of the computer, and writes power management control information, which permits transition to the standby state (L0s or L1) designated by the environment setting information stored in the BIOS-ROM 21, in the link control register of each device, thereby permitting the execution of the ASPM function (step S103).

When the computer is powered on, the BIOS executes the process beginning with step S102 in FIG. 7 in a POST (Power-On Self Test).

As described above, in the "Auto" mode, when AC driving is performed, the transition to L0s or L1 is prohibited in order to place importance on the performance. On the other hand, when battery driving is performed, the transition to L0s or L1 is permitted in order to elongate the battery driving time. Thereby, in accordance with the change in environment of use of the computer, the ASPM function can automatically be rendered effective or non-effective. Therefore, both power saving and good performance can be realized at the same time.

Furthermore, when "Enable" is selected by the user, the BIOS selects the power saving mode as the operation mode of the computer, regardless of the AC driving/battery driving, and executes the above-described process of step S103. When "Disable" is selected by the user, the BIOS selects the performance mode as the operation mode of the computer, regardless of the AC driving/battery driving, and executes the above-described process of step S104.

As has been described above, in the present embodiment, the execution of the ASPM function (communication path control function) is dynamically permitted or prohibited in accordance with the switching of the operation mode of the computer. Therefore, both power saving and good performance can be realized at the same time.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus comprising:
a first device and a second device that are interconnected via a communication path, each of the first and second devices having a communication path control function for transitioning a state of the communication path between an active state and a standby state in which power consumption is lower than in the active state;
a display process module configured to display a screen to select one of an auto mode, a performance mode, and a power saving mode, and to select, as the standby state, one of a first standby state and a second standby state, wherein the power consumption of the communication path in the second standby state is lower than in the first standby state and a time needed for restoration to the active state in the second standby state is longer than in the first standby state;
a first controller configured to detect whether an external power supply is connected to the information processing apparatus when the auto mode is selected, and to set first control information, which indicates permission of transition to one of the first standby state and the second standby state, in each of the first and second devices when the external power supply is not connected to the information processing apparatus and the information processing apparatus is powered by a battery, and to set second control information, which indicates prohibition of execution of the communication path control function, in each of the first and second devices when the external power supply is connected to the information processing apparatus;
a second controller configured to set the first control information in each of the first and second devices when the power saving mode is selected, regardless of connection/disconnection of the external power supply; and
a third controller configured to set the second control information in each of the first and second devices when the performance mode is selected, regardless of connection/disconnection of the external power supply.

2. The information processing apparatus according to claim 1, further comprising a controller configured to generate an interrupt signal in response to connection/disconnection of the external power supply to/from the information processing apparatus,
wherein the detecting module is configured to access the controller in response to generation of the interrupt signal, thereby determining whether the generation of the interrupt signal is due to the connection of the external power supply to the information processing apparatus or the disconnection of the external power supply from the information processing apparatus.

3. A control method that controls an operation of an information processing apparatus including a first device and a second device that are interconnected via a communication path, each of the first and second devices having a communication path control function for transitioning a state of the communication path between an active state and a standby state in which power consumption is lower than in the active state, the method comprising:
displaying a screen to select one of an auto mode, a performance mode, and a power saving mode and selecting one of a first standby state and a second standby state as the standby state, wherein the power consumption of the communication path in the second standby state is lower than in the first standby state and a time needed for restoration to the active state in the second standby state is longer than in the first standby state;
detecting whether an external power supply is connected to the information processing apparatus when the auto mode is selected;
setting first control information which indicates permission of transition to one of the first standby state and the second standby state in each of the first and second devices when the external power supply is not connected to the information processing apparatus and the information processing apparatus is powered by a battery;
setting second control information which indicates prohibition of execution of the communication path control function in each of the first and second devices when the external power supply is connected to the information processing apparatus;
setting the first control information in each of the first and second devices when the power saving mode is selected, regardless of connection/disconnection of the external power supply; and
setting the second control information in each of the first and second devices when the performance mode is selected, regardless of connection/disconnection of the external power supply.

* * * * *